United States Patent
Ni et al.

(10) Patent No.: US 10,604,080 B2
(45) Date of Patent: Mar. 31, 2020

(54) LIFTING FOLDING LUGGAGE RACK

(71) Applicant: Weixiang Tong, Jinhua (CN)

(72) Inventors: Xiaojun Ni, Jinhua (CN); Chengsheng Fang, Jinhua (CN); Weixiang Tong, Jinhua (CN)

(73) Assignee: FORCOME (ZHEJIANG) CO., LTD., Jinhua (CN)

( * ) Notice: Subject to any disclaimer, the term of this patent is extended or adjusted under 35 U.S.C. 154(b) by 0 days.

(21) Appl. No.: 16/293,783

(22) Filed: Mar. 6, 2019

(65) Prior Publication Data
US 2019/0337463 A1  Nov. 7, 2019

(30) Foreign Application Priority Data
May 3, 2018  (CN) .................. 2018 2 0650187 U

(51) Int. Cl.
*B60R 9/06* (2006.01)
*B60P 1/44* (2006.01)

(52) U.S. Cl.
CPC .............. *B60R 9/06* (2013.01); *B60P 1/4414* (2013.01); *B60P 1/4485* (2013.01)

(58) Field of Classification Search
CPC ..... B60R 9/042; B60R 9/0426; B60P 1/4421; B60P 1/4428
See application file for complete search history.

(56) References Cited

U.S. PATENT DOCUMENTS

| | | | | |
|---|---|---|---|---|
| 3,976,213 A * | 8/1976 | Ball | ................ | B60P 3/1025 |
| | | | | 414/462 |
| 4,400,129 A * | 8/1983 | Eisenberg | ............ | A61G 3/0209 |
| | | | | 224/505 |
| 5,011,361 A * | 4/1991 | Peterson | .............. | A61G 3/0209 |
| | | | | 224/497 |
| 5,431,522 A * | 7/1995 | Ross | ................. | B60R 9/06 |
| | | | | 224/497 |
| 5,482,424 A * | 1/1996 | Jones | .................. | A61G 3/0209 |
| | | | | 224/510 |
| 5,816,763 A * | 10/1998 | Hamann | .................. | B60R 9/06 |
| | | | | 414/462 |
| 5,884,824 A * | 3/1999 | Spring, Jr. | ............. | B60R 9/042 |
| | | | | 224/309 |
| 7,396,202 B1 * | 7/2008 | Panzarella | .............. | A61G 3/06 |
| | | | | 414/540 |
| 7,686,562 B2 * | 3/2010 | Panzarella | ................ | B60P 3/07 |
| | | | | 414/462 |
| 8,132,997 B2 * | 3/2012 | Reuille | ................. | B60P 1/4421 |
| | | | | 224/537 |
| 9,011,073 B2 * | 4/2015 | Dieziger | ................ | B60P 1/433 |
| | | | | 414/506 |
| 9,017,002 B1 * | 4/2015 | Joynt | ...................... | B60R 9/06 |
| | | | | 414/462 |
| 9,216,698 B2 * | 12/2015 | Rhodes | .................. | B60R 9/065 |
| 9,463,748 B2 * | 10/2016 | Presley | .................. | B60R 9/042 |
| 9,649,969 B1 * | 5/2017 | Leurck | ................. | B60P 1/4421 |
| 10,052,994 B2 * | 8/2018 | Daneshvar | ............... | B60P 3/06 |

(Continued)

*Primary Examiner* — Brian D Nash
(74) *Attorney, Agent, or Firm* — SZDC Law P.C.

(57) ABSTRACT

A lifting folding luggage rack includes a telescopic device including a telescopic rod; a turnover device including a frame body fixing rod, a resisting rod, a resisting block and a turnover seat; a turnover device including a frame body fixing rod, a resisting rod, a resisting block and a turnover seat; and a frame body.

7 Claims, 3 Drawing Sheets

(56) References Cited

U.S. PATENT DOCUMENTS

| | | | |
|---|---|---|---|
| 10,457,187 B1* | 10/2019 | Nash | B60R 11/04 |
| 2004/0219003 A1* | 11/2004 | Bik | B60R 9/065 |
| | | | 414/462 |
| 2007/0065262 A1* | 3/2007 | Murphy | B60P 1/4421 |
| | | | 414/462 |
| 2008/0138183 A1* | 6/2008 | Lin | B60P 1/4421 |
| | | | 414/546 |
| 2008/0206030 A1* | 8/2008 | Reuille | B60P 1/4421 |
| | | | 414/462 |
| 2008/0250984 A1* | 10/2008 | Panzarella | B60P 1/4421 |
| | | | 108/44 |
| 2013/0142602 A1* | 6/2013 | Barnts | B60P 1/4421 |
| | | | 414/462 |
| 2014/0010622 A1* | 1/2014 | Mizner | B60P 1/4421 |
| | | | 414/634 |
| 2016/0107559 A1* | 4/2016 | Russo | B60P 1/4485 |
| | | | 414/540 |
| 2016/0339842 A1* | 11/2016 | Schut | B60R 3/02 |

* cited by examiner

LIFTING FOLDING LUGGAGE RACK

The present application claims priority to Chinese Application No.: 201820650187.3, filed on May 3, 2018, which is incorporated by reference for all purposes as if fully set forth herein.

TECHNICAL FIELD

The application relates to a luggage rack, in particular to a lifting folding luggage rack.

BACKGROUND ART

The existing luggage rack used at the rear of the off-road vehicle is very extensive, however, the existing luggage rack at the rear of the off-road vehicle generally cannot realize the function of automatic folding or cannot realize lifting and folding at the same time, and the folding of the luggage rack needs to be completed by manually turning over the luggage rack and then fixing the luggage rack, and the luggage rack can be used only by manually opening and then fixing the luggage rack when the luggage rack is opened for use, which is very inconvenient to use.

CONTENT OF THE APPLICATION

In view of the defects of the existing luggage rack, the application aims to solve the technical problem of providing a luggage rack capable of lifting and folding.

In order to achieve the above purpose, according to one aspect of the application, the application is realized by the following technical measures: a lifting folding luggage rack, which comprises a telescopic device, wherein the telescopic device comprises a telescopic rod, the telescopic rod consists of an inner tube and an outer tube sleeved outside the inner tube, the outer tube is also provided with a motor, the bottom of the motor is fixedly connected with a screw rod, and the screw rod is screwed with the top of the inner tube; The turnover device comprises a frame body fixing rod, a resisting rod, a resisting block and a turnover seat, wherein one side of the top of the frame body fixing rod is provided with a guide groove, part of the resisting rod is disposed in the frame body fixing rod by the guide groove, the frame body fixing rod and the resisting rod are fixed through pins, the top of the resisting rod which is not placed in the frame body fixing rod and the resisting block are also fixed through pins, and the fixed resisting rod can swing; The top of the resisting block is opposite to the bottom of the screw rod, one side of the turnover seat is fixed at the bottom of the inner tube, the other side of the turnover seat is clamped on the frame body fixing rod, and the turnover seat and the frame body fixing rod are also fixed through pins, and positioning holes are also formed on the frame body fixing rod between the fixing resisting rod and the two pins fixing the turnover seat; The frame body is fixed on the frame body fixing rod, and the frame body and the resisting rod are respectively arranged at two sides of the frame body fixing rod.

The lifting folding luggage rack drives the telescopic inner tube to move up through the motor to drive the frame body to move up, and in the process of moving up the frame body, the frame body is turned over through the cooperation of the resisting rod and the screw rod.

Furthermore, the bottom of the screw rod is fixed with a ball head, and the top of the resisting block is provided with a ball hole. The above design enables the frame to be turned over to make it smoother or smoother.

Furthermore, the lifting folding luggage rack further comprises a switch, wherein the switch consists of a hollow bolt seat and a bolt, the bolt seat is fixed with the turnover seat, and the bolt passes through the bolt seat and the turnover seat and is inserted into a frame body fixing rod. The above-mentioned design is to make the turnover of the frame controllable. Only the bolt is needed to fix the frame so that the frame cannot be turned over, and the effect of only lifting the frame can be achieved. Thus, the use effect will be better.

Further, one end of the two opposite ends of the bolt seat is inclined and the other end is flat, and the inclined end of the bolt seat is provided with a notch, the flat end of the bolt seat is fixed with the turnover seat, the bolt is a right-angle bolt, the right-angle bolt consists of a cross rod and a vertical rod, the cross rod is sleeved with a gasket I, a spring and a gasket II in sequence, wherein the gasket I is fixed inside the bolt seat, the gasket II is fixed with the cross rod, and the vertical rod is positioned outside the inclined end of the bolt seat. The design structure is reasonable and convenient to use; moreover, the gasket II in the structure may not be used, and the spring can be directly fixed with the cross bar.

Furthermore, the lifting folding luggage rack further comprises a connecting device, wherein the connecting device consists of a connecting seat and a supporting rod, one side of the connecting seat is connected with a rear tail frame of an automobile, the other side of the connecting seat is fixed with the lower end of the supporting rod, and the upper end of the supporting rod is connected with the fixing seat on the telescopic outer tube. The above design makes the lifting folding luggage rack convenient to fix.

Furthermore, the connecting seat and the supporting rod, the supporting rod and the fixing seat are movably fixed. The above design has lower cost and is more convenient to replace parts.

Furthermore, the connecting device also comprises an adjusting roller which is movably fixed on the turnover seat. According to the design, when the frame body is lifted and lowered, the frame body is always horizontal through adjustment of rollers.

Compared with the prior art, the application has the advantages that not only the luggage rack can be lifted and folded at the same time, but also the lifting function can be used independently, and the using effect is obviously better than that of the prior Art

BRIEF DESCRIPTION OF DRAWINGS

The attached drawings forming part of the application are used to provide a further understanding of the application. The illustrative embodiment of the application and its description are used to explain the application and do not constitute improper limitation of the application. In the drawings.

REFERENCE NUMERAL

Figure 1:
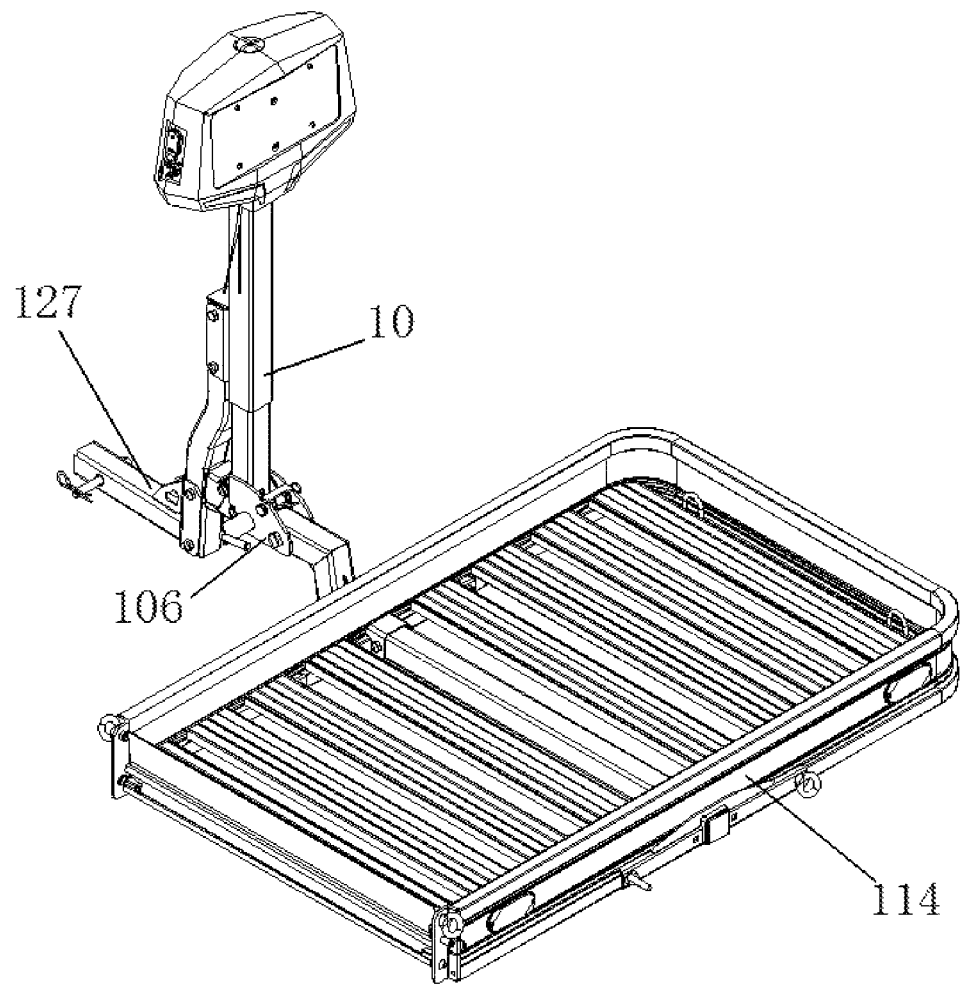
FIG. 1 is a schematic structural diagram of the lifting folding luggage rack mentioned in the application.

101. Telescopic Device; 102. Inner Tube; 103. Outer Tube; 104. Motor; 105. Screw; 106. Reversing Device; 107. Frame Fixing Rod; 108. Resist Rod; 109. Cylinder Head; 110. Resist Block; 111. Turnover Seat; 112. Guide Groove;

113. Positioning Hole; 114. Frame Body; 115. Ball Head; 116. Ball Hole; 117. Transfer Switch; 118. Bolt Seat; 119. Bolt; 120. Inclined Plane; 121. Gap; 122. Cross Bar; 123. Vertical Rod; 124, Gasket I; 125. Spring; 126. Gasket II; 127. Connecting Device; 128. Connecting Seat; 129. Supporting Rod; 130. Adjusting roller.

DETAILED DESCRIPTION OF THE PREFERRED EMBODIMENT

Hereinafter, the application will be described in detail with reference to the drawings and with reference to embodiments. It should be noted that the embodiments in this application and the features in the embodiments can be combined with each other without conflict.

In the description of the application, it should be understood that the orientation or positional relationship indicated by the terms "center," "upper," "lower," "left," "right," "vertical," "horizontal," "inner," "outer" and the like is based on the orientation or positional relationship shown in the drawings, only for convenience of describing the application and simplifying the description, and does not indicate or imply that the indicated device or element must have a specific orientation, be constructed and operated in a specific orientation, and therefore cannot be understood as a limitation of the application.

Example 1

Referring to FIG. 1, a lifting folding luggage rack provided in this embodiment includes a telescopic device 10, a turnover device 106, a frame 114 and a connecting device 127, wherein the turnover device 106 is fixed at the bottom of the telescopic device 10, the frame 114 is fixed at the right side of the turnover device 106, and the connecting device 127 is fixed at the left side of the telescopic device 10.

Figure 2:
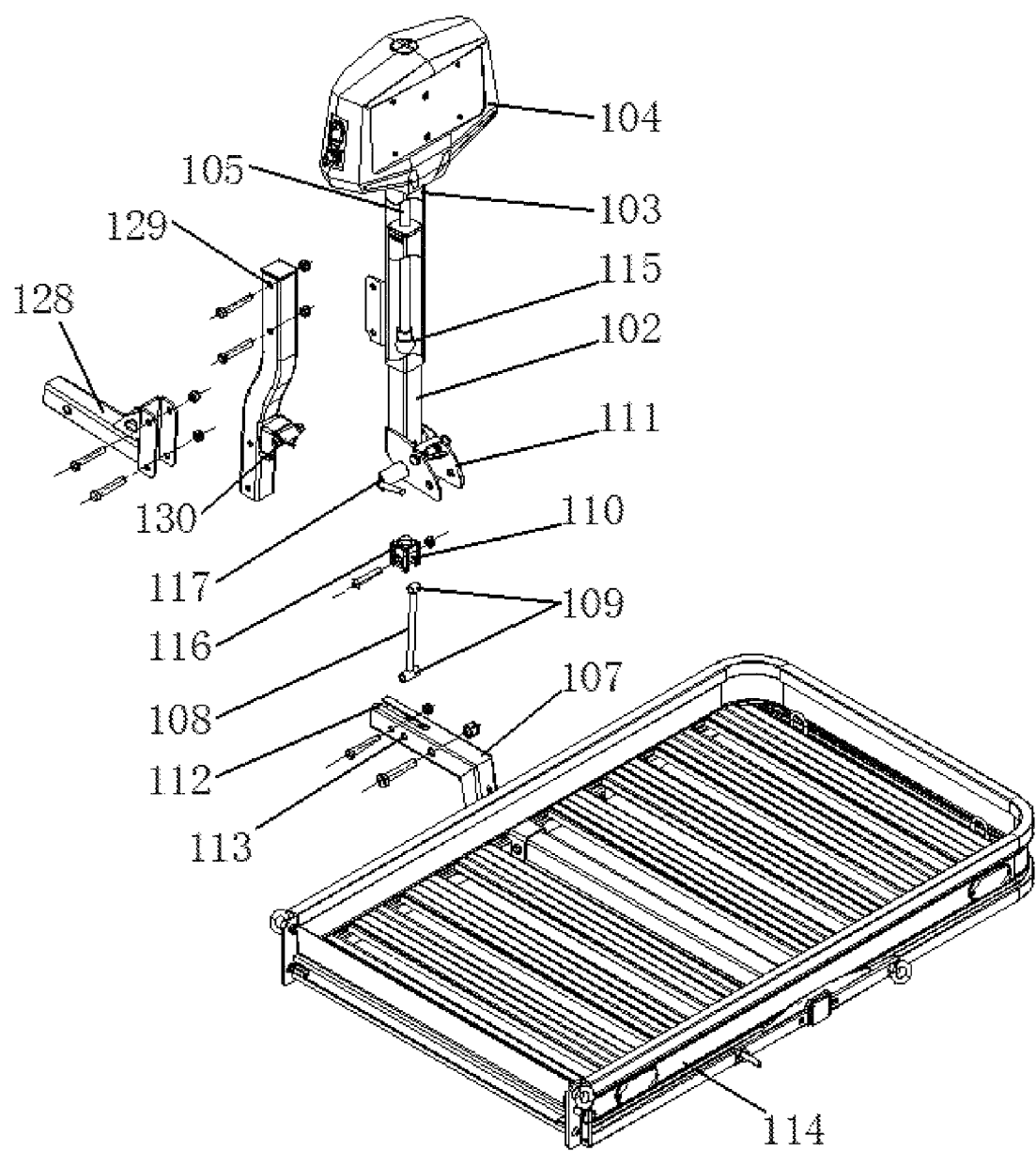
FIG. 2 is a schematic view of the parts of FIG. 1.

Referring to FIG. 2, the telescopic device 10 provided in this embodiment further comprises a telescopic rod composed of an inner tube 102 and an outer tube 103. the inner tube 102 is inserted into the outer tube 103, and the inner tube 102 can move back and forth along the inner portion of the outer tube 103 but the inner tube 102 cannot completely pull out the outer tube 103. a motor 104 is fixed at the top of the outer tube 103, the motor 104 is a servo motor, and a screw 105 is fixed at the bottom of the motor 104. The screw 105 is screwed with the inner tube 102, and a ball head 116 is fixed at the bottom of the screw 105 in the inner tube 102. The screw 105 is driven to rotate by the motor 104, and the inner tube 102 can move up and down. The turnover device 106 provided in this embodiment includes a frame fixing rod 107, a resisting rod 108, a resisting block 110 and a turnover seat 111, wherein the turnover seat 111 is fixed at the bottom of the inner tube 102, and after the resisting rod 110 is fixed at the bottom of the resisting block 110, the resisting block 110 passes through the turnover seat 111 and is positioned inside the inner tube 102.

The frame fixing rod 107 is a hollow square tube, the top of the left side of which is provided with a guide groove 112, the bottom of the resisting rod 108 is clamped into the frame fixing rod 107 from the left side of the guide groove 112, preferably, the top and bottom of the resisting rod 108 are respectively fixed with a cylinder head 109, the resisting rod 108 fixes the resisting block 110, the resisting rod 108 and the frame fixing rod 107 through pins passing through the cylinder head 109 and the turnover seat 111 or the frame fixing rod 107. Continuing to explain, the top of the resisting block 110 is provided with a ball hole 116 matched with a ball head, and the turnover seat 111 is clamped on the frame fixing rod 107 and is also fixed through pins. The frame fixing rod 107 between the fixing resisting rod 108 and the two pins fixing the turnover base 111 is also provided with a positioning hole 113, the positioning hole 113 is used for matching with a changeover switch 117 fixed on the inner side of the turnover base 111, and the frame 114 is fixed on the right side of the frame fixing rod 107. Continuing to explain, the connecting device 127 consists of a connecting base 128, a supporting rod 129 and an adjusting roller 130. The left end of the connecting seat 128 is connected to the rear tail frame of the automobile, the right end of the connecting seat 128 is fixed to the lower end of the support rod 129, the upper end of the support rod 129 is also movably connected with the fixed seat arranged on the outer tube 103, and the adjusting roller 130 is movably connected with the fixed seat fixed on the left side of the turnover seat 111.

Figure 3:
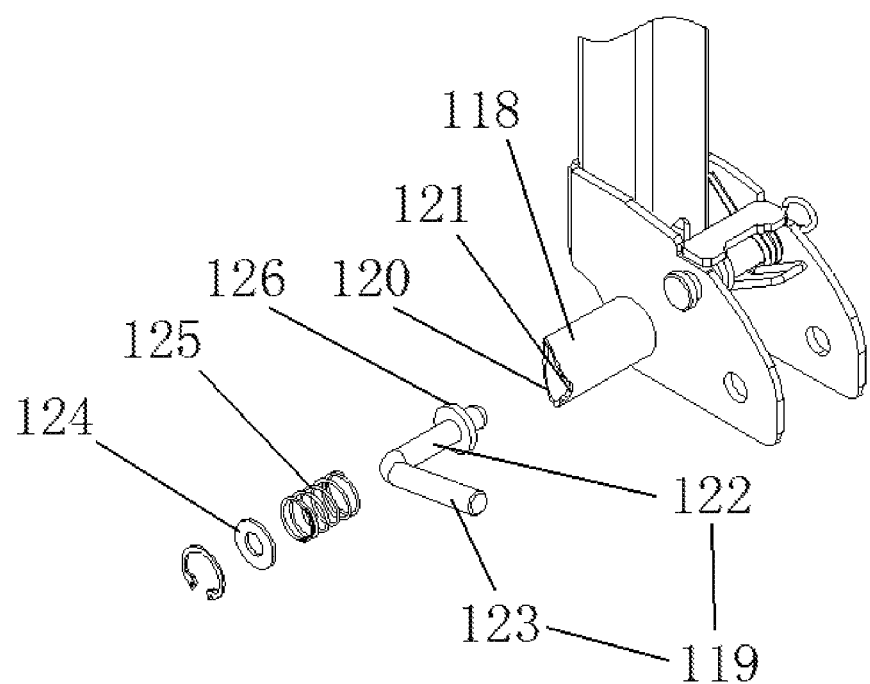
FIG. 3 is a schematic diagram of a changeover switch part of the application.

Referring to FIG. 3, the switch 117 provided in this embodiment includes a bolt seat 118 and a bolt 119. the bolt seat 118 is preferably hollow cylindrical, the right side of the bolt seat 118 is horizontal, the left side of the bolt seat 118 is inclined 120, the horizontal is fixed to the turnover seat 111, the top of the bolt seat 118 on the inclined 120 side is provided with a notch 121, and the bolt 119 is preferably a right angle bolt. The bolt 119 consists of a cross bar 122 and a vertical bar 123, wherein the cross bar 122 is sequentially sleeved with a gasket I 124, a spring 125 and a gasket II 126 from left to right, wherein the gasket I 124 is fixed inside the bolt seat 118, the gasket II 126 is fixed with the cross bar 122, and the vertical bar 123 is positioned outside the inclined surface 120 end of the bolt seat 118.

In this way, when the luggage rack frame 114 is on the ground, the lifting folding luggage rack described in this embodiment can mount the goods on the frame first and then turn on the motor 104. The rotating shaft of the motor 104 drives the screw 105 to rotate forward. The screw 105 drives the inner tube 102 screwed with the screw 105 to move into the outer tube 103. As the frame 114 is fixed with the turnover device 106, the turnover device 106 is fixed with the top of the inner tube 102. The frame 114 will be lifted by the inner tube 102. When the frame 114 is lifted to a level with the lower end of the tail of the car, the ball head 116 at the lower end of the screw 105 in the inner tube 102 just abuts against the blocking block 110 on the overturning device 106. At this time, in order not to overturn the frame 114, the vertical rod 123 of the bolt 119 of the switch 117 on the left side of the overturning seat 111 is located at the lower end of the bevel 120 of the bolt seat 118, that is, the short end. The cross bar 122 of the bolt 119 is inserted into the positioning hole 113 on the frame fixing rod 107 due to the action of the spring 125, so that the turnover seat 111 is fixed with the frame fixing rod 107, and the frame 114 cannot be turned over and folded. When the luggage rack needs to be folded and stored after unloading goods, the bolt 119 on the turnover seat 111 is rotated along the inclined surface 120 of the bolt seat 118 to the notch 121 at the top end of the inclined surface 120, and the bolt 119 is driven and fixed in the notch 121 by the spring 125, so that the bolt 119 is separated from the positioning hole 113 of the frame fixing rod 107. At this time, the motor 104 is rotating forward, the screw 105 continues to rotate, the inner tube 102 continues to expand and contract in the outer tube 103, and the ball head 116 at the lower end of the screw 105 abuts against the ball hole 116 of the resisting block 110 to rotate.

Because the blocking block 110 is inserted into the upper end of the blocking rod 108 and the blocking block 110 and the blocking block 110 are movably fixed, the blocking rod 108 can swing to a certain extent, the lower end of the blocking rod 108 can drive the frame fixing rod 107 to tilt upwards, so that the frame fixing rod 107 continues to move upwards along the guide groove 112 along the overturning seat 111 and the inner tube 102 until folding; otherwise, when the luggage rack needs to be opened, the reversing switch of the motor 104 is turned on, and the motor 104 is reversed. After the screw 105 is reversed, the inner tube 102 extends downward out of the outer tube 103, and the frame 114 will be slowly flattened and then lowered to the ground. Thus, the lifting folding luggage rack described in this embodiment is very convenient to open, use and fold, and the lifting folding can be used alone.

Example 2

The lifting and folding luggage rack described in this embodiment is also provided with an adjusting roller 130 on the left side of the turnover seat 111. When the frame 114 is laid flat, the adjusting roller 130 abuts against the lower end of the support rod 129, so that the frame 114 forms an included angle horizontally and upwards. When goods are put into the frame 114, the frame 114 can be kept horizontal due to the weight of the goods. When the frame 114 is turned over and folded, the adjusting roller 130 rolls to the upper end of the support rod 129, and the turned-over frame 114 continues to be kept vertical.

The above description is only the preferred embodiment of the application and is not intended to limit the application. For those skilled in the art, the invention can be changed and changed. Any modification, equivalent substitution, improvement, etc. made within the spirit and principle of the application shall be included in the protection scope of the invention.

The invention claimed is:

1. A lifting folding luggage rack comprising:
a telescopic device including a telescopic rod, wherein the telescopic rod consists of an inner tube and an outer tube sleeved outside the inner tube, the outer tube is also provided with a motor; the bottom of the motor is fixedly connected with a screw rod, and the screw rod is screwed with the top of the inner tube;
a turnover device including a frame body fixing rod, a resisting rod, a resisting block and a turnover seat, wherein one side of the top of the frame body fixing rod is provided with a guide groove, part of the resisting rod is disposed in the frame body fixing rod by the guide groove, the frame body fixing rod and the resisting rod are fixed through pins, the top of the resisting rod which is not placed in the frame body fixing rod and the resisting block are also fixed through pins, and the resisting rod can swing, the top of the resisting block is opposite to the bottom of the screw rod, one side of the turnover seat is fixed at the bottom of the inner tube, the other side of the turnover seat is connected to the frame body fixing rod, and the turnover seat and the frame body fixing rod are also fixed through pins, and positioning holes are also formed on the frame body fixing rod between the resisting rod and the two pins fixing the turnover seat; and
a frame body, wherein the frame body is fixed on the frame body fixing rod, and the frame body and the resisting rod are respectively arranged at two sides of the frame body fixing rod.

2. The lifting folding luggage rack according to claim 1, wherein a ball head is fixed at the bottom of the screw rod, and a ball hole is formed at the top of the resisting block.

3. The lifting folding luggage rack according to claim 1, further comprising a changeover switch, wherein the changeover switch consists of a hollow bolt seat and a bolt, the bolt seat is fixed with the turnover seat, and the bolt passes through the bolt seat and the turnover seat and is inserted with the frame body fixing rod.

4. The lifting folding luggage rack according to claim 3, wherein one end of the two opposite ends of the bolt seat is inclined and the other end is planar, and the inclined surface end of the bolt seat is provided with a notch, the planar end of the bolt seat is fixed with the turnover seat, the bolt is a right-angle bolt, the right-angle bolt consists of a cross rod and a vertical rod, the cross rod is sleeved with a gasket I, a spring and a gasket II in sequence, wherein the gasket I is fixed with the inside of the bolt seat, the gasket II is fixed with the cross rod, and the vertical rod is positioned outside the inclined surface end of the bolt seat.

5. The lifting folding luggage rack according to claim 1, further comprising a connecting device which consists of a connecting seat and a supporting rod, wherein one side of the connecting seat is connected with a rear tail frame of an automobile, the other side of the connecting seat is fixed with the lower end of the supporting rod, and the upper end of the supporting rod is connected with the fixing seat on the telescopic outer tube.

6. The lifting folding luggage rack according to claim 5, wherein the connecting seat and the supporting rod as well as the supporting rod and the fixing seat are movably fixed.

7. The lifting folding luggage rack according to claim 5, wherein the connecting device further comprises an adjusting roller which is movably fixed on the turnover seat.

* * * * *